US012794046B2

(12) United States Patent
Huang et al.

(10) Patent No.: US 12,794,046 B2
(45) Date of Patent: Nov. 10, 2026

(54) BATTERY AND ELECTRONIC DEVICE

(71) Applicant: Dongguan NVT Technology Limited, Dongguan (CN)

(72) Inventors: Xiaozhao Huang, Dongguan (CN); YongWei He, Dongguan (CN); Hongbo Shi, Dongguan (CN); JIanbin Li, Dongguan (CN)

(73) Assignee: DONGGUAN NVT TECHNOLOGY LIMITED, Dongguan City (CN)

( * ) Notice: Subject to any disclaimer, the term of this patent is extended or adjusted under 35 U.S.C. 154(b) by 915 days.

(21) Appl. No.: 18/088,943

(22) Filed: Dec. 27, 2022

(65) Prior Publication Data

US 2023/0207932 A1 Jun. 29, 2023

(30) Foreign Application Priority Data

Dec. 24, 2021 (CN) ......................... 202111599200.X

(51) Int. Cl.

*H01M 50/148* (2021.01)
*H01M 50/105* (2021.01)
*H01M 50/186* (2021.01)
*H01M 50/503* (2021.01)
*H01M 50/574* (2021.01)

(52) U.S. Cl.

CPC ....... *H01M 50/148* (2021.01); *H01M 50/105* (2021.01); *H01M 50/186* (2021.01); *H01M 50/503* (2021.01); *H01M 50/574* (2021.01)

(58) Field of Classification Search

CPC ............. H01M 50/148; H01M 50/186; H01M 50/574; H01M 50/105; H01M 50/503

See application file for complete search history.

(56) References Cited

U.S. PATENT DOCUMENTS

2008/0008910 A1 1/2008 Koh
2014/0349142 A1* 11/2014 Kim .................. H01M 10/0436 29/623.2
2015/0311568 A1 10/2015 Byun et al.
2019/0229305 A1 7/2019 Wang et al.

FOREIGN PATENT DOCUMENTS

| | | | |
|---|---|---|---|
| CN | 202042558 | U | 11/2011 |
| CN | 103165934 | A | 6/2013 |
| CN | 211404613 | U | 9/2020 |
| CN | 212303779 | U | 1/2021 |
| CN | 113611986 | A | 11/2021 |
| CN | 113690538 | A | 11/2021 |
| CN | 214672765 | U | 11/2021 |
| CN | 214957079 | U | 11/2021 |

(Continued)

OTHER PUBLICATIONS

WO2021109670 translation (Year: 2021).*

(Continued)

*Primary Examiner* — Jane J Rhee

(57) ABSTRACT

A battery is provided with a protective body. The protective body is configured to protect an electronic component provided on a circuit board body, so as to reduce probability of the electronic component being subjected to impact, and provide buffering for the electronic component upon impact, thereby reducing the risk of falling-off or damage of the electronic component.

19 Claims, 8 Drawing Sheets

(56) References Cited

FOREIGN PATENT DOCUMENTS

| | | | |
|---|---|---|---|
| EP | 3035413 | A1 | 6/2016 |
| WO | 2021109670 | A1 | 6/2021 |

OTHER PUBLICATIONS

First Office Action of IN patent application No. 202214075625, dated Mar. 1, 2023.
First Office Action of CN patent application No. 202111599200.X, dated Jul. 11, 2023.
Second Office Action of CN patent application No. 202111599200.X, dated Jan. 18, 2024.
Partial European Search Report for EP application No. 22216737.1, dated Jun. 29, 2023.
Extended European Search Report for EP application No. 22216737.1, dated Oct. 19, 2023.

* cited by examiner

BATTERY AND ELECTRONIC DEVICE

CROSS REFERENCE TO THE RELATED APPLICATIONS

The present application claims priority to Chinese Patent Application No. 202111599200.X, filed on 24 Dec. 2021, the disclosure of which is hereby incorporated by reference in its entirety.

TECHNICAL FIELD

This application relates to the battery field, and specifically, to a battery and an electronic device.

BACKGROUND

To cater to the tendency of making various electronic devices lighter and thinner, the trend of controlling battery volume and increasing battery capacity has become mainstream in the industry. To minimize the size of batteries, manufacturers generally strive to optimize the design of head space of batteries. In this context, foldable top sealed batteries become quite popular currently. In a foldable top sealed battery, a circuit board is provided at the head of the battery such that electronic components on the circuit board are susceptible to impact, leading to a high risk of falling-off or damage.

SUMMARY

Some embodiments of this application provide a battery and an electronic device for resolving the problem that an electronic component on a circuit board provided at the head of the battery is susceptible to impact and at high risk of falling-off or damage.

According to a first aspect, an embodiment of this application provides a battery, including a cell and a circuit board electrically connected to the cell, where a packaging bag for the cell includes a first body portion, a top sealing portion, and a side sealing portion, where the first body portion includes a bottom wall, two side walls, and a top wall, the top sealing portion is connected to the top wall and bent towards the top wall, and each of the two side sealing portions is connected to one of the two side walls and bent towards the one of the two side walls respectively; the top sealing portion is connected to the two side sealing portions, each of the two side sealing portions respectively have a first side at an end opposite from the top wall, the top sealing portion has a second side at an end opposite from the top wall, a first included angle and a second included angle are formed between a the second side of the top sealing portion and the first side of the two side sealing portions respectively, and the circuit board is located between the first included angle and the second included angle; and the battery further includes a protective body, where the circuit board includes a circuit board body and an electronic component provided on the circuit board body. The protective body is configured to protect the electronic component, which can reduce the probability of the electronic component being subjected to impact, and provide buffering for the electronic component upon impact, thereby reducing the risk of the electronic component being damaged and falling off the circuit board body.

In some embodiments, the protective body covers the electronic component and a gap between the electronic component and the circuit board body, which protects the electronic component from direct impact and allows the electronic component to be fastened to the circuit board body, reducing the risk of the electronic component falling off the circuit board body.

In some embodiments, the protective body is provided on a surface of the circuit board facing towards the cell, and a bonding piece is provided between the protective body and the cell. The bonding piece bonds the protective body to the top sealing portion of the cell, which can improve stability of the protective body and the circuit board at the head of the cell.

In some embodiments, a height of the protective body protruding from the electronic component is $H_1$, and 0.03 mm≥$H_1$≥0.3 mm.

In some embodiments, a thickness of the circuit board is $D_0$, where 0.4 mm≥$D_0$≥1.0 mm. The circuit board is not easily deformed, reducing the risk of falling-off of the electronic component, and reducing the head length of the battery.

In some embodiments, the protective body covers the circuit board and a gap between the circuit board and the cell. The protective body protects both sides of the circuit board, further reducing the risk of damage and falling-off of the electronic component.

In some embodiments, the protective body also covers the first included angle and the second included angle, to protect the first included angle and the second included angle, which can increase impact resistance of the first included angle and the second included angle, and reduce the risk of the folded angle being deformed and damaged by impact.

In some embodiments, the battery further includes a flexible printed circuit board, where the flexible printed circuit board includes a first portion, a second portion, and a bending portion, the first portion is connected to the circuit board and is wrapped by the protective body, the second portion is provided outside the protective body, and the bending portion connects the first portion and the second portion and allows the second portion to change position relative to the first portion. The bending portion is provided outside the protective body, which enables the flexible printed circuit board to change a bending orientation easily, better adapting to electrical connection between the battery or the flexible printed circuit board and an external device.

In some embodiments, the protective body includes a second body portion and an edge portion that are interconnected, where the second body portion covers two opposite surfaces of the circuit board, the edge portion covers the first included angle and the second included angle, and the bending portion is provided on the edge portion.

In some embodiments, a distance between the bending portion and the second body portion in a first direction is $Di_1$, and a height difference between the second body portion and the edge portion in a second direction is $H_2$, where $D_1$≥0.5 mm, 0.5 mm≥$H_2$≥2 mm, and the first direction is perpendicular to the second direction. The second body portion and the edge portion form a notch of the protective body. A size of the notch can be controlled so that the bending portion of the flexible printed circuit board has enough space for bending.

In some embodiments, on a side of the second body portion facing away from the cell, a height of the second body portion protruding from the electronic component is $H_3$, and 0.1 mm≥$H_3$≥0.5 mm; and a height of the edge portion protruding from the first included angle and the second included angle is $H_4$, and 0.1 mm≥$H_4$≥0.5 mm. This allows the protective body to effectively protect the electronic component and the first included angle and the second included angle, and also reduces the head length of the battery.

In some embodiments, an included angle between the first side and a second direction is $\alpha_1$, where $5° \geq \alpha_1 \geq 45°$, and the second direction is a direction of the cell facing towards the circuit board. This reduces the risk of the included angle being crushed by a mold during preparation of the protective body, and reduces the risk of the included angle being broken by concentrated stress.

In some embodiments, the protective body is provided with a groove on a side facing away from the cell, where the groove exposes a conductive part of the battery, and the conductive part is electrically connected to the circuit board and a tab of the cell. During preparation of the protective body, a positioning pin may be disposed in the groove to position the circuit board and prevent the circuit board from rebounding, and the positioning pin abuts against the conductive part, not against the circuit board directly, which can avoid crushing the electronic component.

In some embodiments, the groove is located at the center of the conductive part, or at the center of an orthographic projection of the cell in the first direction, reducing deflection of the positioning pin while such deflection may crush the electronic component.

In some embodiments, the protective body is an injection molding body formed through a low-pressure injection molding process or a glue filling process.

In some embodiments, the protective body includes a bracket, where the bracket includes a first plate body, a second plate body, and a third plate body, the third plate body connects the first plate body and the second plate body that are disposed opposite each other, and the first plate body and the second plate body respectively extend to two opposite sides of the circuit board.

In some embodiments, the bracket further includes a reinforcing part, where the reinforcing part is provided between at least one of the first plate body and the second plate body and the circuit board, so as to keep a distance between the board body and the circuit board.

In some embodiments, a thickness of the reinforcing part is $D_2$, where $0.2\ mm \geq D_2 \geq 0.5$ mm.

In some embodiments, a height of the first plate body and the second plate body protruding from the corresponding electronic component is $H_5$, and $0.03\ mm \geq H_5 \geq 0.2$ mm.

In some embodiments, a thickness of the first plate body and/or the second plate body is $D_3$, where $0.2\ mm \geq D_3 \geq 0.5$ mm.

In some embodiments, the first plate body and/or the second plate body is provided with a clearance zone, where the conductive part of the battery is provided in the clearance zone, and the conductive part is electrically connected to the circuit board and a tab of the cell.

In some embodiments, the conductive part is flush with or protrudes from the corresponding plate body.

In some embodiments, a distance between an edge of the clearance zone and the conductive part is $L_1$, and $1\ mm \geq L_1$, reducing the risk of interference between the clearance zone and the conductive part due to process tolerance.

In some embodiments, the protective body includes an elastic sheet, where the elastic sheet is provided on at least one surface of the circuit board; the elastic sheet is in contact with the electronic component on a corresponding side of the circuit board; and/or the elastic sheet is provided on the conductive part of the battery. This can protect the electronic component, and also reduce the risk of short circuit caused by accidental connection between the conductive part and other components.

In some embodiments, the elastic sheet is a foam with a thickness of $D_4$, where $0.2\ mm \geq D_4 \geq 0.8$ mm; or the elastic sheet is a silicon rubber pad with a thickness of $D_4$, where $0.03\ mm \geq D_4 \geq 0.3$ mm.

According to a second aspect, an embodiment of this application provides an electronic device, including a load and the battery according to any one of the foregoing embodiments, where the battery is configured to supply power to the load. The electronic device has the beneficial effects achieved by the corresponding battery.

DETAILED DESCRIPTION

In some embodiments of this application, a battery is provided with a protective body. The protective body is configured to protect an electronic component provided on a circuit board body, so as to reduce probability of the electronic component being subjected to impact, and provide buffering for the electronic component upon impact, thereby reducing the risk of falling-off or damage of the electronic component.

A function of the circuit board needs to be adaptively set according to an actual requirement. For example, the circuit board may be integrated with a BMS (Battery management system) for implementing overcurrent protection, overvoltage protection, charging protection, power detection, output short circuit protection, temperature detection, and the like, so as to ensure safety. Specifically, the circuit board may be a printed circuit board (Printed Circuit Board, PCB), a flexible printed circuit board (Flexible Printed Circuit, FPC), or a combination thereof.

Embodiment 1

Figure 1:
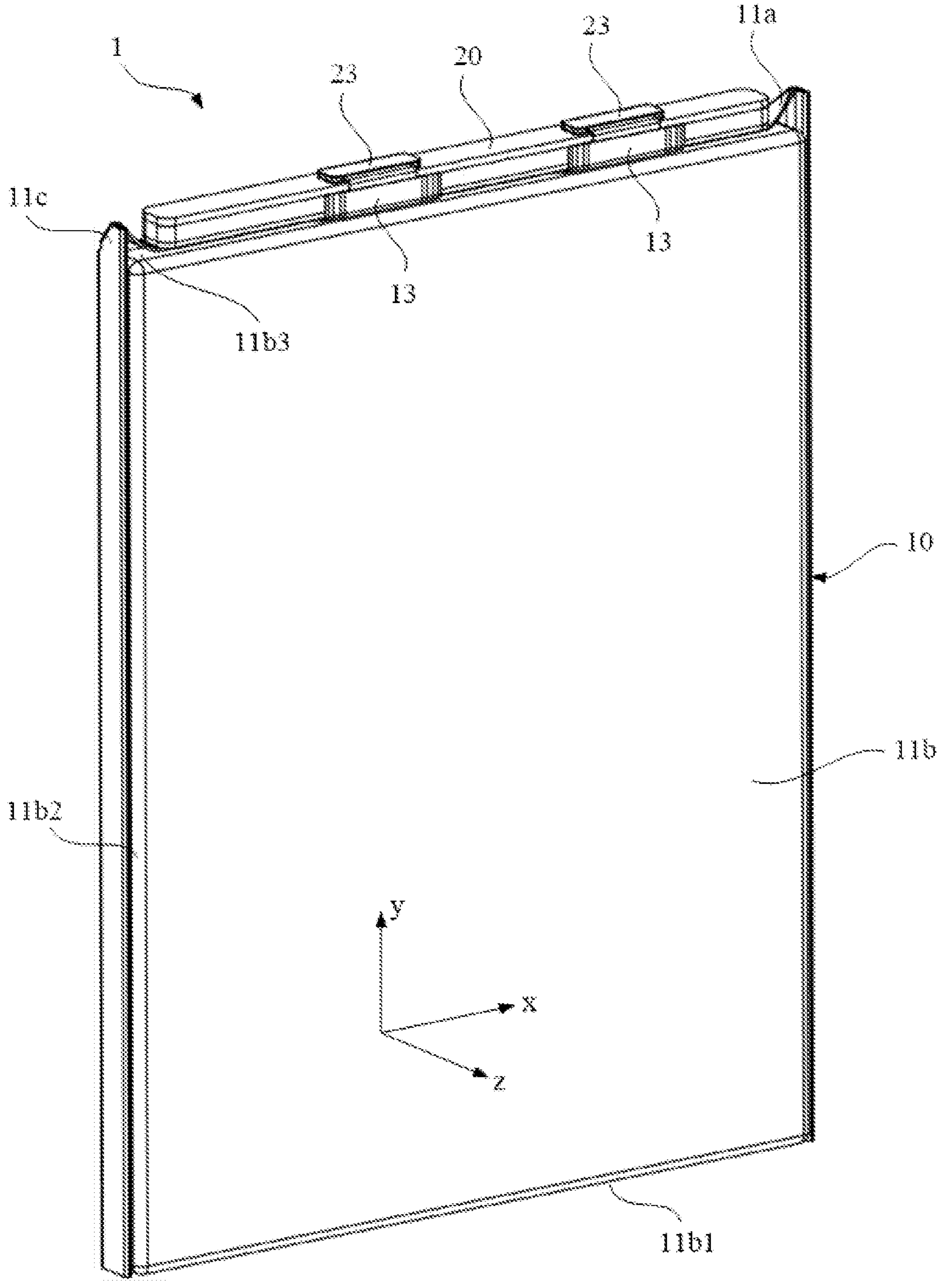
FIG. 1 is a three-dimensional structural diagram of a battery according to a first embodiment of this application.
Figure 2:
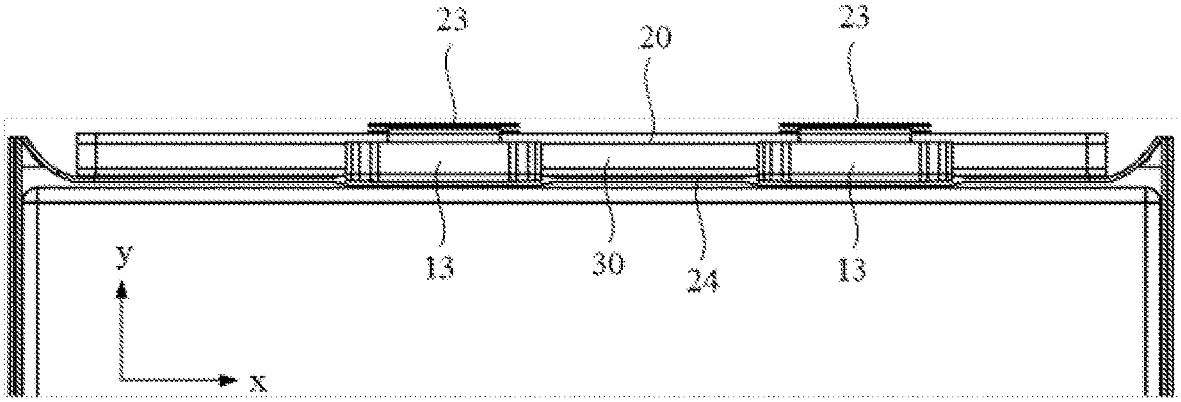
FIG. 2 is a schematic diagram of a partial structure of the battery shown in FIG. 1.
Figure 3:
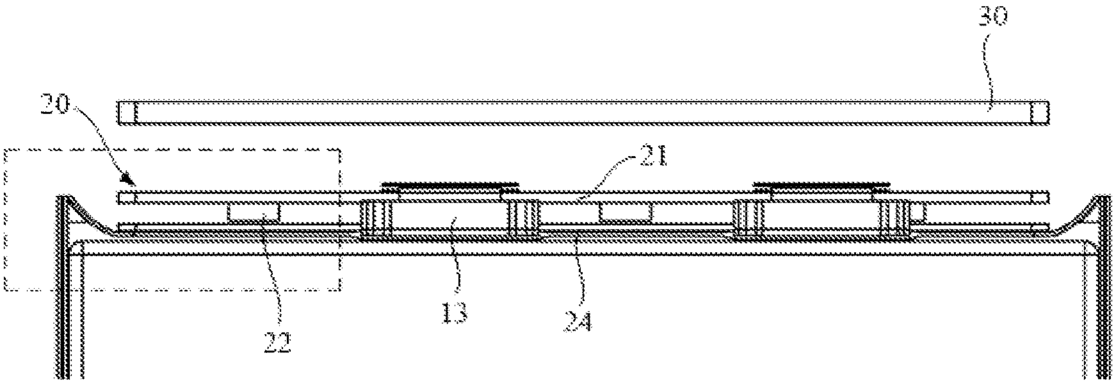
FIG. 3 is a schematic exploded view of a protective body and a head of the battery shown in FIG. 2.
Figure 4:
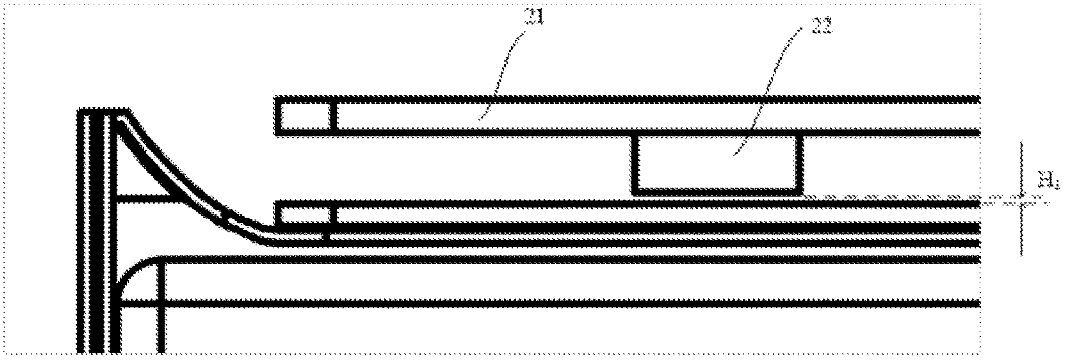
FIG. 4 is an enlarged schematic structural diagram of the area defined by dashed line shown in FIG. 3.

Referring to FIG. 1 to FIG. 3, a battery 1 includes a cell 10 and a circuit board 20 electrically connected to the cell 10. The cell 10 includes a packaging bag 11, an electrode assembly (not shown in the figure), and tabs 13.

The packaging bag 11 encloses the cell 10 to shape and define appearance of the cell 10. For example, the packaging bag 11 includes a top sealing portion 11*a*, a first body portion 11*b*, and a side sealing portion 11*c*, the electrode assembly is provided inside the first body portion 11*b*, and the top sealing portion 11*a* and the tabs 13 extend from a top wall 11*b*3 of the first body portion 11*b*. The first body portion 11*b* is provided with an accommodating cavity, internal components (such as the electrode assembly and electrolyte) of the cell 10 is accommodated in the accommodating cavity, and the packaging bag 11 is used to protect the internal components, improving the protection effect and safety.

The first body portion 11*b* includes a bottom wall 11*b*1, two side walls 11*b*2, and the top wall 11*b*3. The bottom wall 11*b*1 and the top wall 11*b*3 are disposed facing away from each other. The side wall 11*b*2 separately connects to the bottom wall 11*b*1 and the top wall 11*b*3. The top sealing portion 11*a* and the side sealing portion 11*c* are formed through packaging with the packaging bag 11 after the electrode assembly is accommodated in the first body portion 11*b*. The top sealing portion 11*a* connects to the top wall 11*b*3, and the side sealing portion 11*c* connects to the side wall 11*b*2.

The side sealing portion 11*c* is bent towards the side wall 11*b*2, and the top sealing portion 11*a* is bent towards the top wall 11*b*3. The top sealing portion 11*a* and the side sealing portion 11*c* may be bent towards a same direction, for example, both are bent towards the large side wall 11*b*2 (also known as the largest face) of the cell 10 along a third direction z. The side sealing portion 11*c* and the top sealing portion 11*a* are bent so that the width and length of the cell 10 are reduced, meeting size requirements of external electrical devices and implementing a wider range of application. In addition, the side sealing portion 11*c* and the top sealing portion 11*a* are relatively weak parts of the cell 10. The side sealing portion 11*c* and the top sealing portion 11*a* are bent toward the first body portion 11*b* of the packaging bag 11 so that the side sealing portion 11*c* and the top sealing portion 11*a* are less likely to be damaged by impact or the like.

In some embodiments of this application, the third direction z is a thickness direction of the cell 10, a length direction of the cell 10 may be a second direction y, and a width direction of the tab 13 and a width direction of the cell 10 may both be a first direction x, where the first direction x, the second direction y, and the third direction z are perpendicular to each other. It should be noted that, subject to the actual processing or measurement errors (also known as tolerance), "being perpendicular" in this application does not require that an included angle between the two be 90°, but allows a deviation of ±10°. In other words, "being perpendicular" can be understood that an included angle between any two directions is 80° to 100°.

On the top wall 11*b*3 of the first body portion 11*b*, the top sealing portion 11*a* is configured to seal the packaging bag 11 to prevent electrolyte from leaking from the top wall 11*b*3 of the packaging bag 11 and prevent impurities such as water and oxygen outside the packaging bag 11 from entering into the first body portion 11*b* of the packaging bag 11 from the top wall 11*b*3. The top sealing portion 11*a* also seals a protruding area of the tab 13, so as to seal a joint of the packaging bag 11 and the tab 13.

The quantity and polarity of the tab 13 can be adaptively set according to an actual requirement. For example, in a scenario that the cell 10 has positive and negative polarities, the electrode assembly includes a positive electrode plate, a negative electrode plate, and a separator provided between the positive electrode plate and the negative electrode plate. The electrode assembly may be formed by electrode plates through winding or stacking, one end of the tab 13 extends into the packaging bag 11 and is electrically connected to the electrode plate of a corresponding polarity, and another end of the tab 13 extends out of the top sealing portion 11*a*. Adaptively, the tabs 13 include a first tab and a second tab, where the first tab is a negative tab, and the second tab is a positive tab. The first tab is electrically connected to the negative electrode plate, the second tab is electrically connected to the positive electrode plate, and the first tab and the second tab both extend to the outside of the packaging bag 11. In other embodiments, the first tab may be a positive tab, and the second tab may be a negative tab. The first tab and the second tab may have the same or different structures, and may be arranged symmetrically in the first direction x or asymmetrically. In some embodiments of this application, one of the tabs 13 is used as an example for describing a structure of the tab 13.

It should be understood that the structure and shape of the tab 13 is not limited by some embodiments of this application. For example, the tab 13 may be a rectangular strip-like structure, its size can be adaptively set according to an actual requirement, and the material includes, but is not limited to, alloys such as aluminum, nickel, copper, and nickel plated copper. For example, a material of the positive tab 13 may be aluminum or nickel plated aluminum, and a material of the negative tab 13 may be nickel plated copper, which can not only improve electrical connection with the negative electrode plate, but also improve structural strength of the negative tab.

The top sealing portion 11*a* is a structure protruding from the first body portion 11*b* of the cell 10. Referring to FIG. 1 and FIG. 3, the top sealing portion 11*a* being bent towards the top wall 11*b*3 includes either of the following scenarios: In a first scenario, the top sealing portion 11*a* is at least partially in contact with the top wall 11*b*3, for example, a portion of the top sealing portion 11*a* closer to the top wall 11*b*3 is in contact with the top wall 11*b*3; or a side surface of the top sealing portion 11*a* closer to the top wall 11*b*3 is entirely in contact with the top wall 11*b*3. In a second scenario, in the second direction y, the top sealing portion 11*a* and the top wall 11*b*3 are disposed opposite each other and spaced apart with a predetermined distance greater than zero. The predetermined distance may be determined according to actual scenario requirements, for example, may be greater than 0 and less than or equal to 1 mm.

Figure 5:
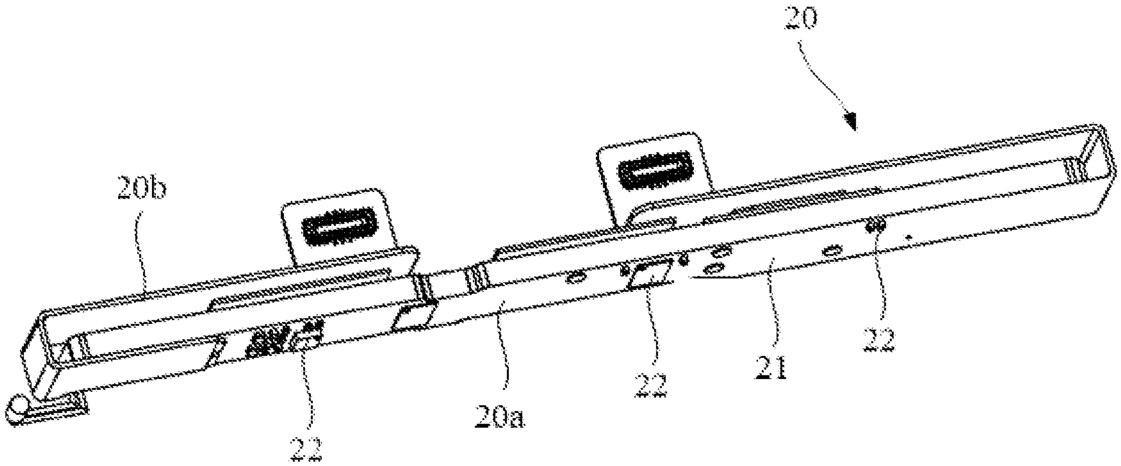
FIG. 5 is a schematic structural diagram of another circuit board according to an embodiment of this application.

The circuit board 20 is not limited to specific shapes and implementations in some embodiments of this application. For example, as shown in FIG. 1 to FIG. 4 and FIG. 6, the circuit board 20 is a plate body. For another example, as shown in FIG. 5, the circuit board 20 includes a first circuit board 20*a* and a second circuit board 20*b* that are interconnected, the first circuit board 20*a* may be a rigid printed circuit board, and the second circuit board 20*b* may be a flexible printed circuit board.

Referring to FIG. 1 to FIG. 5, the circuit board 20 includes a circuit board body 21 and an electronic component 22, the electronic component 22 is provided on the circuit board body 21, the circuit board 20 is provided on a side of the top sealing portion 11*a* of the cell 10 facing away from the electrode assembly, and the circuit board 20 is electrically connected to the tab 13 of the battery 10, for example, the circuit board 20 is electrically connected to the tab 13 through a conductive part 23. Optionally, in some embodiments shown in FIG. 1 to FIG. 3, the circuit board 20 is fastened to an upper surface of the top sealing portion 11*a*, which reduces length of a head structure of the battery 1 in the second direction y, thereby reducing head space of the battery 1.

The battery 1 further includes a protective body 30, and the protective body 30 covers the electronic component 22 and a gap between the electronic component 22 and the circuit board body 21. In some embodiments shown in FIG. 1 to FIG. 3, the protective body 30 covers one side of the circuit board 20. It should be understood that in other embodiments, the protective body 30 may cover two opposite sides of the circuit board 20, or partially or entirely wrap the circuit board 20.

The protective body 30 can protect the electronic component 22 from direct impact (for example, from a battery compartment). Even if the head of the battery 1 is impacted from outside, the protective body 30 can provide buffering. For example, an elastic protective body 30 can be deformed upon impact to buffer the impact. In addition, the protective body 30 can improve relative stability between the electronic component 22 and the circuit board body 21. In this way, the protective body 30 can reduce the risk of damage and falling-off of the electronic component 22.

The protective body 30 may be an injection molding body formed through a low-pressure injection molding process or a glue filling process. The protective body 30 may be made of a material with performance such as insulation, corrosion resistance, water and oxygen resistance, including but not limited to ABS, PP, PVC, and PC. The protective body 30 can protect a component (for example, the electronic component 22) covered by the protective body 30 from corrosion. The protective body 30 made of PP is used as an example. In a scenario that the corrosion resistance of the protective body 30 is tested by salt spray, the battery 1 is placed in a salt spray test chamber, and a salt spray environment is created in the volume space of the salt spray test chamber to evaluate salt spray corrosion resistance of a product. After a predetermined time (for example, 1 hour) under high temperature conditions, a ratio of corroded area of the protective body 30 to total area of the protective body 30 is almost zero, well protecting components located in the protective body 30 from external corrosion.

Still referring to FIG. 1 to FIG. 3, the protective body 30 is provided only on a surface of the circuit board 20 facing towards the cell 10, requiring glue injection on a single side. Compared with glue injection on two opposite sides of the circuit board 20, glue injection on a single side can reduce glue usage and reduce the head length of the battery 1. For example, in an actual scenario, compared with double-sided glue injection, single-sided glue injection can reduce the length of the battery 1 by 0.03 mm to 0.3 mm.

A bonding piece 24 may be provided between the protective body 30 and the cell 10. The bonding piece 24 bonds the protective body 30 to the top sealing portion 11*a* of the cell 10, allowing the protective body 30 and the circuit board 20 to be reliably fastened at the head of the cell 10 (that is, the top sealing portion 11*a*). In other embodiments, no bonding piece 24 is provided, and a gap between the circuit board 20 and the cell 10 may be covered through the protective body 30, that is, the protective body 30 bonds the circuit board 20 to the top sealing portion 11*a* of the cell 10.

In some scenarios, a material of the bonding piece 24 includes but is not limited to double-sided adhesive, foam, hot melt adhesive, and an adhesive heat dissipation material, and is preferably hot melt adhesive. The bonding piece 24 may entirely or partially cover the top sealing portion 11*a*, and/or the bonding piece 24 may be provided on the top sealing portion 11*a* in a straight or wavy shape. It should be understood that a coating shape of the bonding piece 24 is not limited in some embodiments of this application.

Because a side of the circuit board 20 facing towards the cell 10 is provided with the electronic component 22, a surface of the circuit board 20 facing towards the cell 10 is uneven. Therefore, a surface of the protective body 30 facing towards the cell 10 can be prepared as a flat surface for the bonding piece 24 to bond the protective body 30 to the top sealing portion 11*a* of the cell 10.

Optionally, a height of the protective body 30 protruding from the electronic component 22 is $H_1$, and 0.03 mm$\geq H_1 \geq$0.3 mm. A thickness of the protective body 30 being within such threshold can effectively protect the electronic component 22 from impact, prevent the electronic component 22 from accidentally touching an external component, and also minimize the head length of the battery 1, conducive to the design of increasing capacity of the battery 1.

Figure 6:
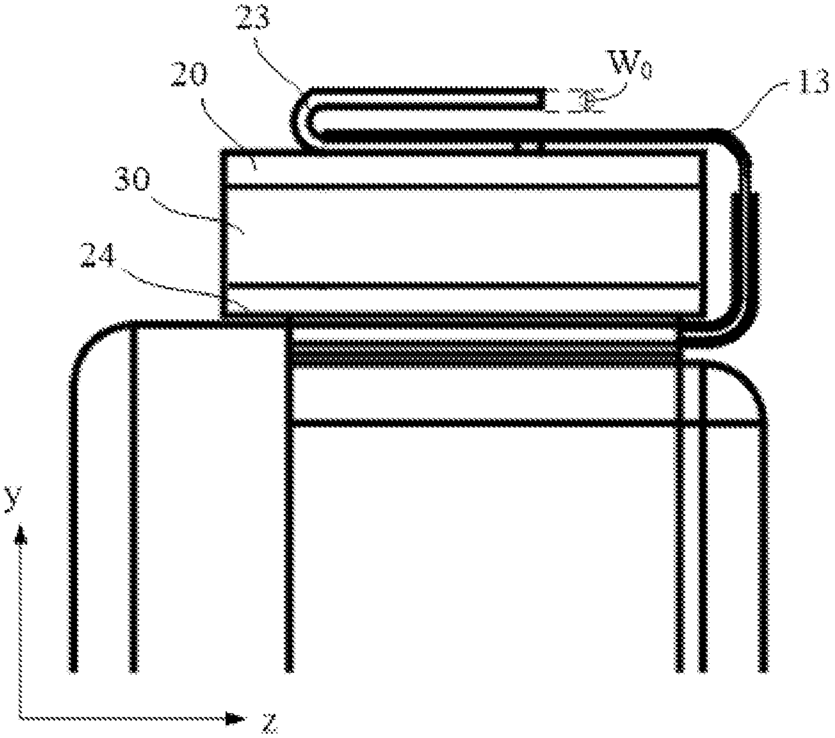
FIG. 6 is schematic side-view structural diagram of a head of the battery shown in FIG. 1.

In an embodiment, the orientation of the circuit board 20, shape and orientation of the conductive part 23, and the like may be adaptively set according to an actual requirement. For example, a thickness of the circuit board 20 is $D_0$, where 0.4 mm$\geq D_0 \geq$1.0 mm. The circuit board 20 is not easily deformed, reducing the risk of falling-off of the electronic component 22 and reducing the head length of the battery 1. For another example, referring to FIG. 6, the circuit board 20 is located between the conductive part 23 and the cell 21, distance between the conductive part 23 and the cell 21 is large, the conductive part 23 is a U-shaped structure, and the bent tab 13 is inserted into and welded to the U-shaped conductive part 23. This can increase bending space for the tab 13, reduce the risk of fracture, and reduce bending-triggered rebounds. As shown in FIG. 6, a thickness of the conductive part 23 is $W_0$, and 0.05 mm$\geq W_0 \geq$0.15 mm, conducive to reducing the head length of the battery 1 while avoiding welding through the conductive part 23.

Embodiment 2

For ease description, this application uses a same reference sign to identify components with a same name. Different from Embodiment 1, referring to FIG. 7 to FIG. 11, the battery 1 of Embodiment 2 includes the foregoing circuit board 20 and a flexible printed circuit board 20*b*. The circuit board 20 may be regarded as the first circuit board 20*a* shown in FIG. 5, and the flexible printed circuit board 20*b* may be regarded as the second circuit board 20*b* shown in FIG. 5. Two flexible printed circuit boards 20*b* shown in the figure are respectively electrically connected to two opposite ends of the circuit board 20 disposed in the first direction x. The foregoing description is merely an example.

The flexible printed circuit board 20*b* includes a first portion 20*b*1, a second portion 20*b*2, and a bending portion 20*b*3. The first portion 20*b*1 is connected to the circuit board 20 and may be connected to a side surface of the circuit board 20 facing towards the cell 10, and the first portion 20*b*1 may be entirely wrapped by the protective body 30. The second portion 20*b*2 is provided outside the protective body 30. The bending portion 20*b*3 connects the first portion 20*b*1 and the second portion 20*b*2 and allows the second portion 20*b*2 to change position relative to the first portion 20*b*1, that is, the second portion 20*b*2 can be bent at an adaptive angle relative to the first portion 20*b*1. The bending portion 20*b*3 is provided outside the protective body 30 and is not wrapped by the protective body 30, allowing the second portion 20*b*2 to change bending orientation. An external terminal 20*b*4 disposed at a free end of the second portion 20*b*2 can change orientation, conducive to electrical connection between the battery 1 or the flexible printed circuit board 20*b* and external devices (such as another battery, a battery compartment, and an electrical device).

Figure 7:
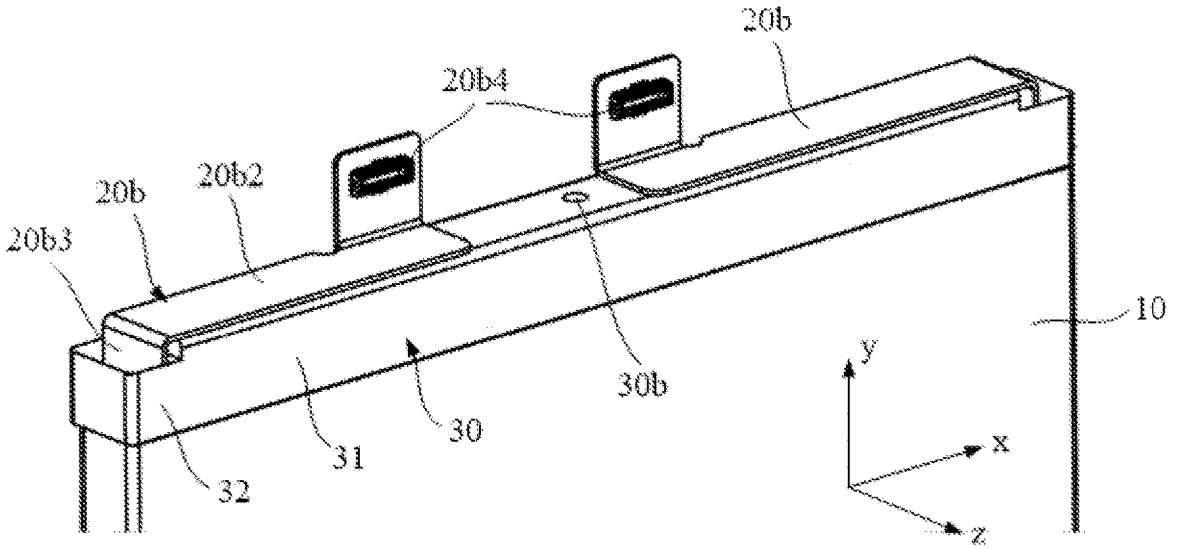
FIG. 7 is a three-dimensional structural diagram of a head of a battery according to a second embodiment of this application.
Figure 8:
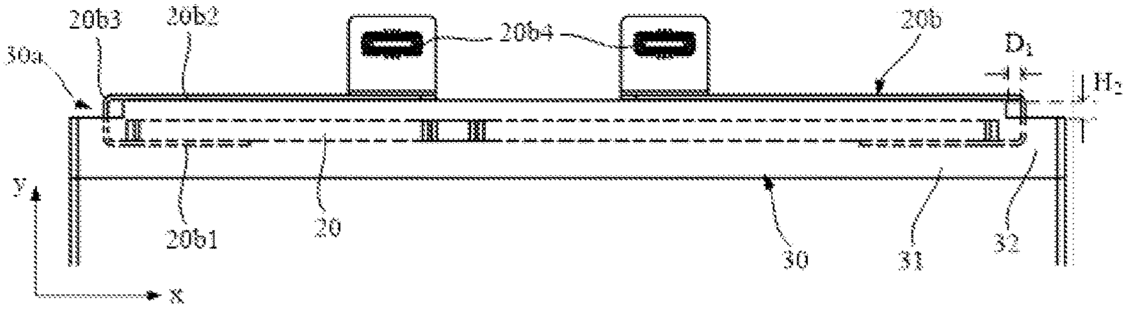
FIG. 8 is a structural perspective view of the head of the battery shown in FIG. 7.

As shown in FIG. 7 and FIG. 8, the protective body 30 includes a second body portion 31 and an edge portion 32 that are interconnected, the second body portion 31 covers two opposite surfaces of the circuit board 20, and in the second direction y, height of the edge portion 32 is lower than height of the second body portion 31 so as to form a notch 30*a*. The bending portion 20*b*3 is provided on the edge portion 32 and is located in the notch 30*a*. In this way, the bending portion 20*b*3 is not wrapped by the protective body 30, allowing the second portion 20*b*2 to change the bending orientation without increasing the head length of the battery 1.

In some scenarios, a distance between the bending portion 20*b*3 and the second body portion 31 in the first direction x is $D_1$; and a height difference between the second body portion 31 and the edge portion 32 in the second direction y is $H_2$, where $D_1>0.5$ mm, 0.5 mm$\geq H_2 \geq 2$ mm. A size of the notch 30*a* being controlled within such threshold range provides sufficient space for the bending portion 20*b*3 to bend.

Figure 9:
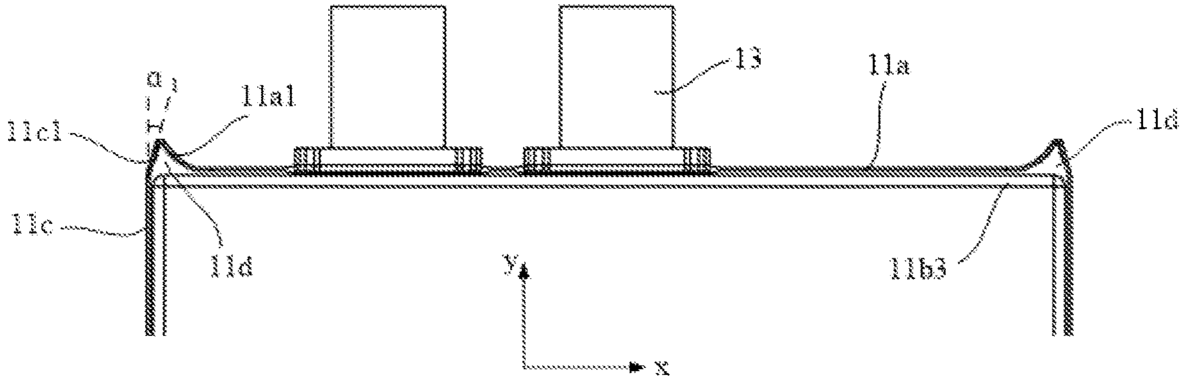
FIG. 9 is a schematic structural diagram of a head of a battery with a tab not folded according to an embodiment of this application.

Referring to FIG. 9, an end of the side sealing portion 11*c* opposite from the top wall 11*b*3 has a first side 11*c*1, an end of the top sealing portion 11*a* opposite from the top wall 11*b*3 has a second side 11*a*1, and an included angle 11*d* is formed between the first side 11*c*1 and the second side 11*a*1. The cell 1 shown in the figure has two side sealing portions 11*c*, and therefore there may be two included angles 11*d*, and the two included angles 11*d* are disposed opposite each other in the first direction x. The protective body 30 may cover the included angle 11*d*. As shown in FIG. 7 to FIG. 10, the edge portion 32 of the protective body 30 covers the included angle 11*d*.

The form of the included angle 11*d* may be adaptively set according to an actual requirement. For example, in some scenarios, an included angle between the first side 11*c*1 and the second direction y is $\alpha_1$, and $5° \geq \alpha_1 \geq 45°$, that is, the included angle 11*d* is bent inward by 5° to 45°. This can reduce the risk of the included angle 11*d* being crushed by an injection or glue filling mold during preparation of the protective body 30, and reduce the risk of the included angle 11*d* being broken by concentrated stress.

In Embodiment 2, the protective body 30 covers the circuit board 20 and a gap between the circuit board 20 and the cell 10, and the protective body 30 protects both surfaces of the circuit board 20, further reducing the risk of damage and falling-off of the electronic component 22. In some scenarios, on a side of the second body portion 31 facing away from the cell 10, a height of the second body portion 31 protruding from the electronic component 22 is $H_3$, and 0.1 mm$\geq H_3 \geq 0.5$ mm; and a height of the edge portion 32 protruding from the included angle 11*d* is $H_4$, and 0.1 mm$\geq H_4 \geq 0.5$ mm. The heights $H_3$ and $H_4$ being within the threshold ranges allows the protective body 30 to effectively protect the electronic component 22 and the included angle 11*d*, and reduces the head length of the battery 1.

Figure 10:
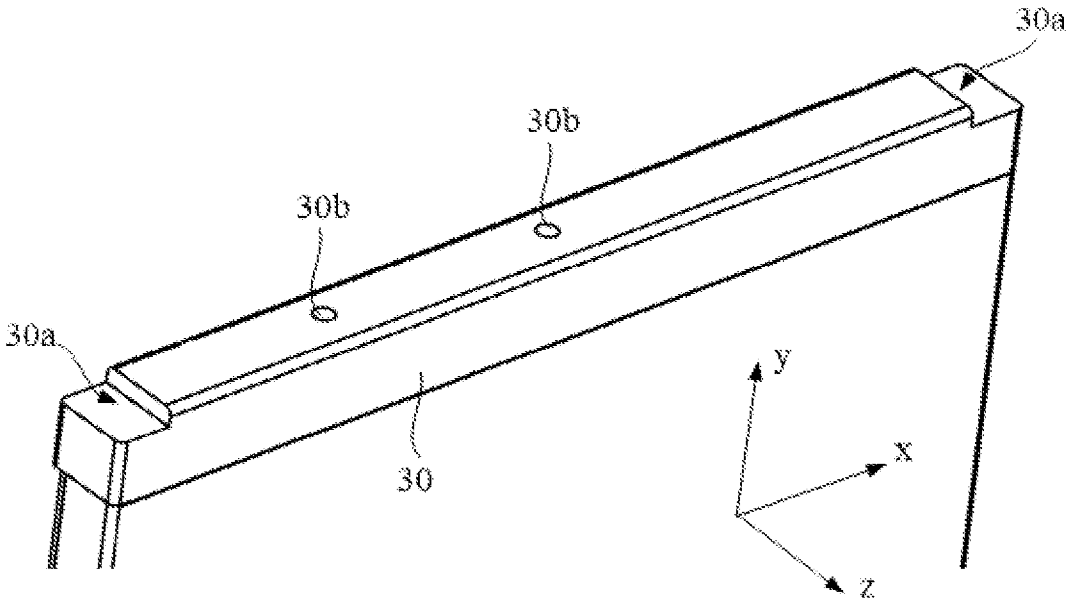
FIG. 10 is a schematic structural diagram of a protective body at the head of the battery shown in FIG. 7.

Still referring to FIG. 7 and FIG. 10, a side of the protective portion 30 facing away from the cell 10 is provided with a groove 30*b*, and the groove 30*b* exposes the conductive part 23 of the battery 1. During preparation of the protective body 30, a positioning pin may abut against the conductive part to fix the position of the circuit board 20, preventing the circuit board 20 from rebounding in a direction leaving the cell 10. The protective body 30 can fix the circuit board 20 at the desired position. After the protective body 30 is prepared, the positioning pin is removed, and the groove 30*b* is formed on the protective body 30 at the position of the positioning pin. The positioning pin abuts against the conductive part 23, not directly against the circuit board 20. Because of high structural strength and good supporting effect, the conductive part 23 can prevent the positioning pin from crushing or scratching the circuit board 20 and the electronic component 22 on the circuit board 20.

Figure 11:
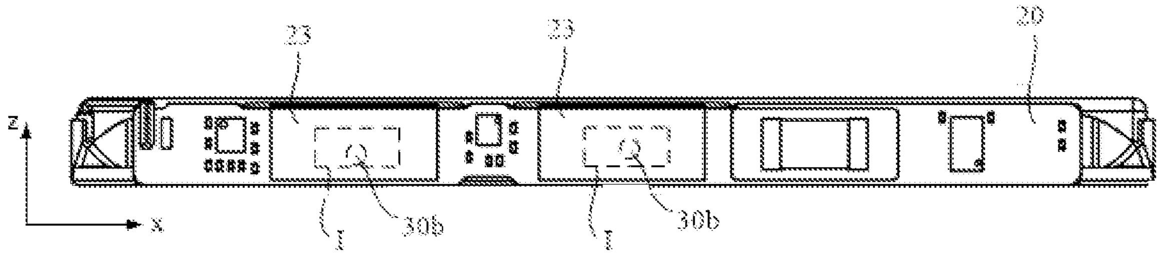
FIG. 11 is a schematic diagram of positions of a groove and a conductive part of a circuit board according to an embodiment of this application.
Figure 12:
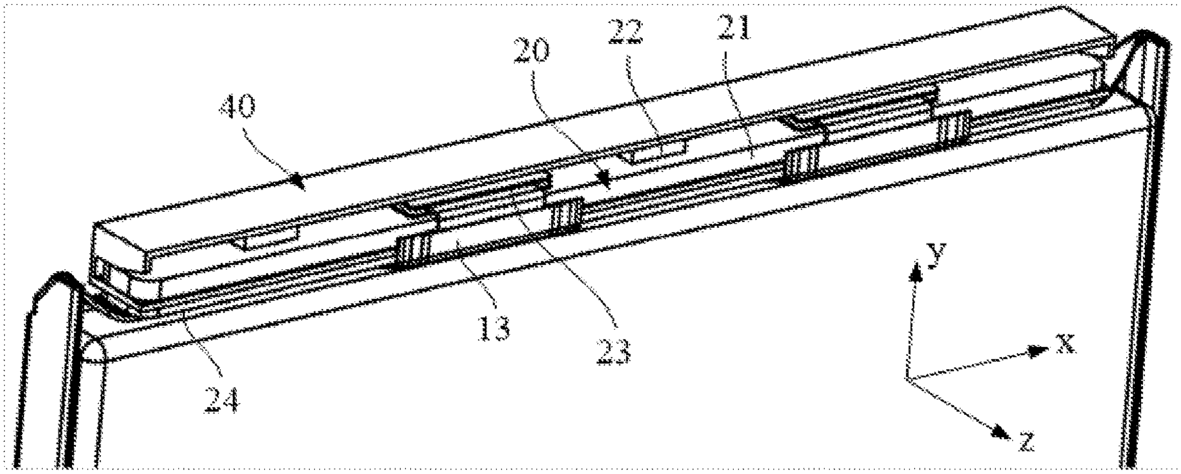
FIG. 12 is a three-dimensional structural diagram of a head of a battery according to a third embodiment of this application.
Figure 13:
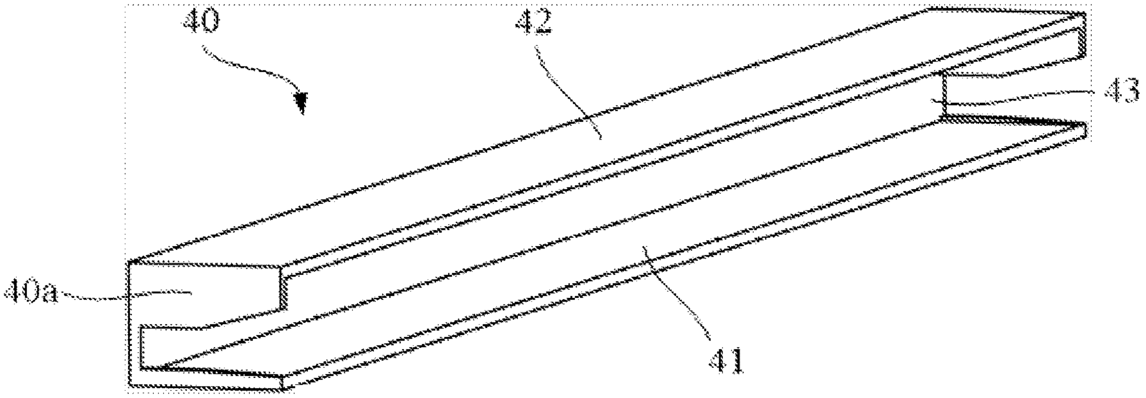
FIG. 13 is a schematic structural diagram of a protective body shown in FIG. 12.

In some scenarios, each groove 30*b* is located at the center of the conductive part 23 in the second direction y, for example, the groove 30*b* on the right side in FIG. 11 is located at the center of the corresponding conductive part 23; or the groove 30*b* is located at the center of an orthographic projection of the cell 10 in the second direction y; or the groove 30*b* may not be located at the center of the conductive part 23 (for example, the groove 30*b* on the left side in FIG. 11 is not located at the center of the corresponding conductive part 23), but is correspondingly located within a predetermined range I (for example, the dashed line area in the figure) of the conductive part 23, but the center of the conductive part 23 is located within the predetermined range I. The predetermined range I may have a length of 6 mm in the first direction x and a width of 4 mm in the third direction z. The conductive part 23 is subject to a uniform force from the positioning pin, reducing the risk of crushing the electronic component 22 caused by deflection of the positioning pin.

Embodiment 3

Embodiment 3 is based on the description of Embodiments 1 and 2. However, different from Embodiments 1 and 2, the protective body 30 of Embodiment 3 is implemented in a form of bracket. The bracket is numbered 40 for differentiation. The bracket 40 is preferably made of an insulating material. For example, the material and manufacturing process may be the same as those of the foregoing protective body 30.

Referring to FIG. 12 to FIG. 16, the bracket 40 includes a first plate body 41, a second plate body 42, and a third plate body 43, the third plate body 43 connects one end side of the first plate body 41 and one end side of the second plate body 42 that are disposed opposite each other, and another end side of the first plate body 41 and another end side of the second plate body 42 respectively extend to two opposite sides of the circuit board 20. For the structure of the circuit board 20 in Embodiment 3, reference may be made to Embodiment 1.

The first plate body 41 is provided between the circuit board 20 and the top sealing portion 11*a* of the cell 10. Optionally, the foregoing bonding piece 24 may be provided between the first plate body 41 and the top sealing portion 11*a*, and the bonding piece 24 bonds the first plate body 41 to the top sealing portion 11*a* of the cell 10, reducing the head length of the battery 1.

The second plate body 42 is provided on a side of the circuit board 20 facing away from the cell 10.

The first plate body 41 and the second plate body 42 may be above the electronic component 22 on a corresponding surface of the circuit board 20. In some scenarios, a height of the first plate body 41 and the second plate body 42 protruding from the corresponding electronic component 22 is $H_5$, and 0.03 mm≥$H_5$≥0.2 mm; optionally, a thickness of the first plate body 41 and/or the second plate body 42 is $D_3$, and 0.2 mm≥$D_3$≥0.5 mm, ensuring structural strength of the plate body. For example, in scenarios shown in FIG. 12 to FIG. 15, a height of the second plate body 42 protruding from the corresponding electronic component 22 is $H_5$. $H_5$ and/or $D_3$ being controlled within the corresponding threshold range can protect the electronic component 22 from impact and reduce the head length of the battery 1.

The third plate body 43 can protect the circuit board 20 from or reduce impact from a side.

Figure 14:
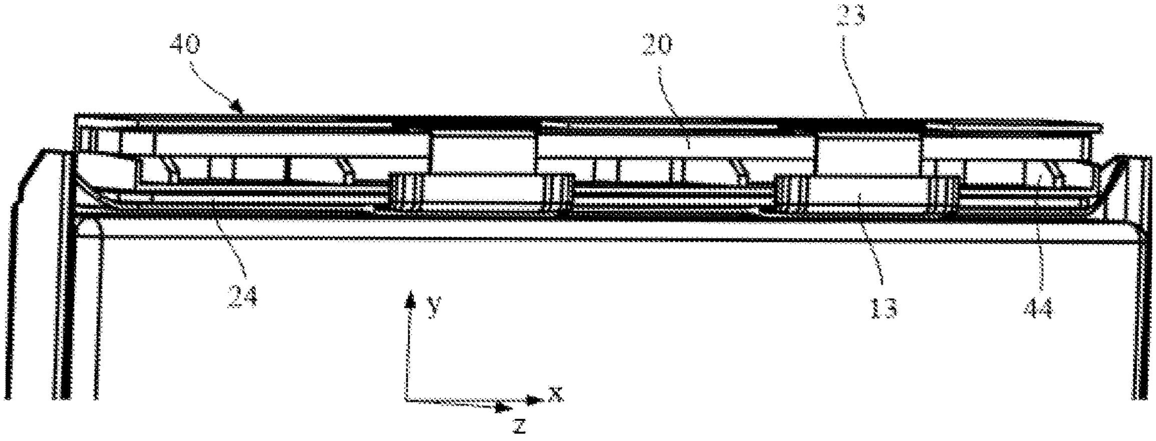
FIG. 14 is a three-dimensional structural diagram of another head of a battery according to a third embodiment of this application.
Figure 15:
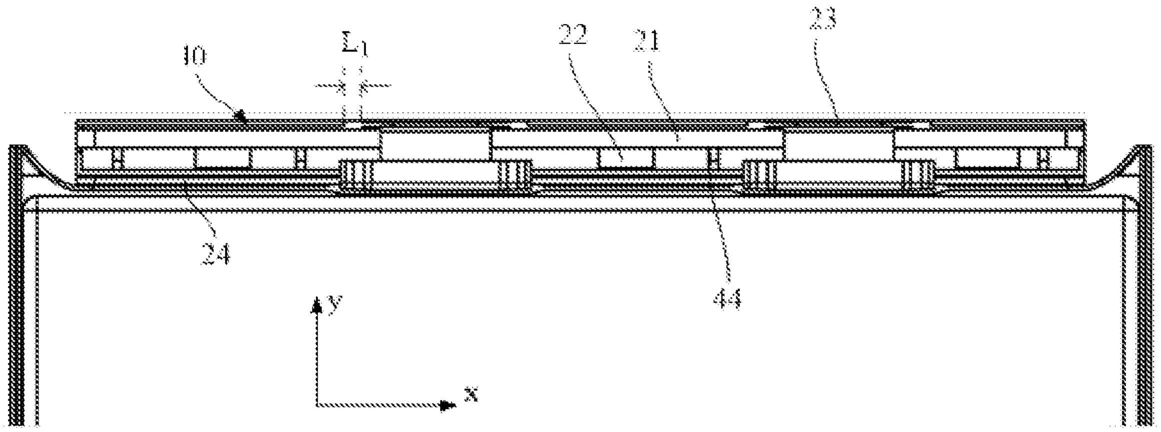
FIG. 15 is a structural front view of the head of the battery shown in FIG. 14.
Figure 16:
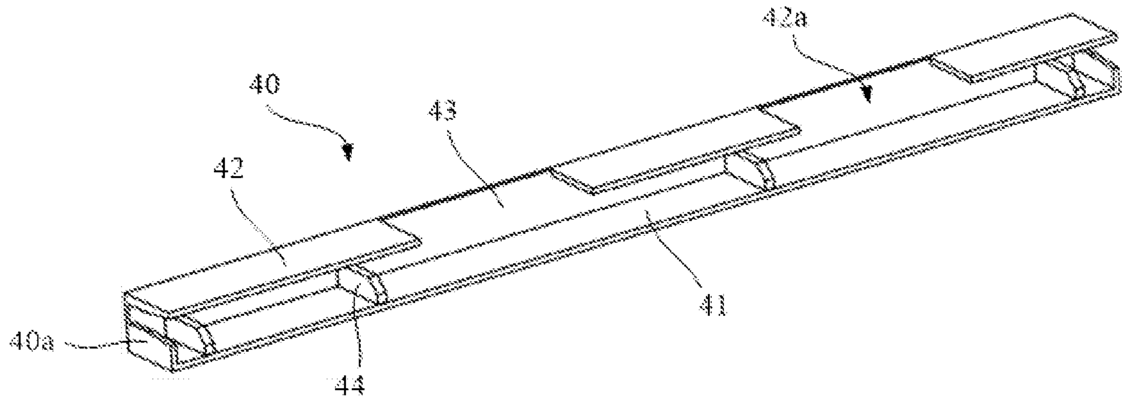
FIG. 16 is a schematic structural diagram of a protective body shown in FIG. 15.

Referring to FIG. 14 to FIG. 16, the bracket 40 may further include a reinforcing part 44. The reinforcing part 44 is provided between the first plate body 41 and the circuit board 10, keeping a distance between the first plate body 41 and the circuit board 20. Certainly, the reinforcing part 44 may alternatively be provided only between the second plate body 42 and the circuit board 10, or be provided between the first plate body 41 and the circuit board 10 and between the second plate body 42 and the circuit board 10. In some scenarios, a thickness of the reinforcing part 44 is $D_2$, and 0.2 mm≥$D_2$≥0.5 mm, ensuring structural strength of the reinforcing part 44.

Referring to FIG. 14 to FIG. 16, the second plate body 42 may be provided with a clearance zone 42*a*, and the conductive part 23 of the battery 1 is provided in the clearance zone 42*a*. In some scenarios, the conductive part 23 may be flush with or protrude from the second plate body 42. For example, in scenarios shown in FIG. 14 and FIG. 15, the conductive part 23 may be flush with the second plate body 42 so as to reduce length of the head of the battery 1.

A distance between an edge of the clearance zone 42*a* and the conductive part 23 is $L_1$, and 1 mm≥$L_1$, reducing the risk of interference between the clearance zone 42*a* and the conductive part 23 caused by process tolerance.

Still referring to FIG. 12 to FIG. 16, the bracket 40 may further include a blocking part 40*a*, and the blocking part 40*a* is provided at each of two opposite ends of the bracket 40 in the first direction x. The blocking part 40*a* is not an entire plate body, but is provided with an opening to allow the circuit board 20 (that is, the circuit plate body 21) to be accommodated therein, so as to fasten the circuit board 20.

Embodiment 4

Figure 17:
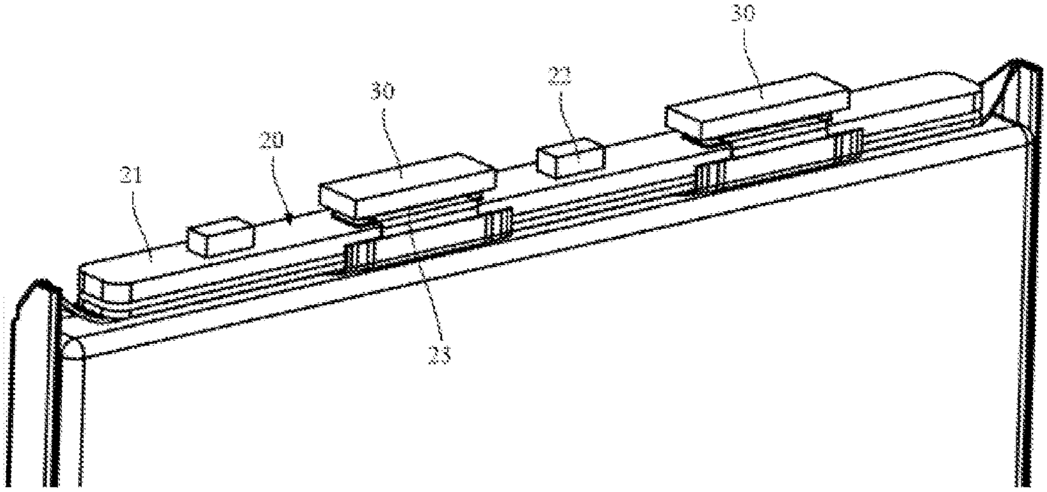
FIG. 17 is a three-dimensional structural diagram of a head of a battery according to a fourth embodiment of this application.
Figure 18:
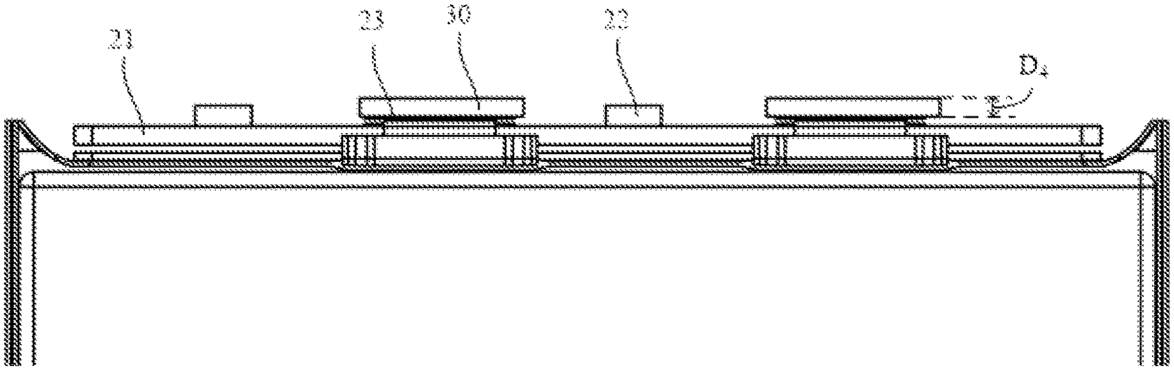
FIG. 18 is a structural front view of the head of the battery shown in FIG. 17.

Embodiment 4 is based on the description of the foregoing embodiments. However, differing from the foregoing embodiments, as shown in FIG. 17 and FIG. 18, the protective body 30 can be implemented as an elastic sheet, such as a sheet or block structure in the figure. The elastic sheet 30 is provided on at least one surface of the circuit board 20. For example, in scenarios shown in FIG. 17 and FIG. 18, the elastic sheet 30 is provided only on a surface of the circuit board 20 facing away from the cell 10. For the structure of the circuit board 20 in Embodiment 4, reference may be made to Embodiment 1.

The elastic sheet 30 may be provided on the conductive part 23 of the battery 1. Alternatively, for example, a one-piece elastic sheet 30 may cover the circuit board 20 and be in contact with the electronic component 22 on a corresponding side of the circuit board 20. This can protect the electronic component 22, and also reduce the risk of short circuit caused by accidental connection between the conductive part 23 and another component.

In some scenarios, the elastic sheet 30 is a foam with a thickness of $D_4$, and 0.2 mm≥$D_4$≥0.8 mm; or the elastic sheet 30 is a silicon rubber pad with a thickness of $D_4$, and 0.03 mm≥$D_4$≥0.3 mm.

In specific scenarios, the foregoing battery 1 according to any one of the foregoing embodiments of this application includes but is not limited to all kinds of primary batteries, secondary batteries, fuel batteries, solar batteries, or capacitor (for example, super capacitor) batteries. The battery 1 may be a pouch battery. The battery 1 may preferably be a lithium secondary battery. The battery 1 in some embodiments of this application may exist in a form of a battery, a battery unit, or a battery module.

An embodiment of this application further provides an electronic device, including a load and the battery 1 according to any one of the foregoing embodiments. The battery 1 supplies power to the load. Because the electronic device has the battery 1 according to any one of the foregoing embodiments, the electronic device can achieve beneficial effects of the battery 1 according to corresponding embodiments.

The electronic device may be implemented in various specific forms, for example, electronic products such as an unmanned aerial vehicle, an electric bicycle, an electric cleaning tool, an energy storage product, an electric vehicle, an electric bicycle, or an electric navigation tool. In some practical scenarios, the electronic device specifically includes, but is not limited to, a standby power source, a motor, an automobile, a motorcycle, a motor bicycle, a bicycle, an electric tool, a large household battery, a lithium-ion capacitor, and the like.

What is claimed is:

1. A battery comprising a cell and a circuit board electrically connected to the cell, wherein a packaging bag of the cell comprises a first body portion, a top sealing portion and two side sealing portions, and the first body portion comprises a bottom wall, two side walls, and a top wall;

the top sealing portion is connected to the top wall and bent towards the top wall, wherein in a first direction, the top sealing portion is located between the two side sealing portions, and in a second direction, the top sealing portion bent toward the top wall is disposed between the circuit board and the top wall, and the first direction is perpendicular to the second direction; each of the two side sealing portions is connected to one of the two side walls and bent towards the one of the two side walls respectively; the top sealing portion is connected to the two side sealing portions, each of the two side sealing portions respectively have a first side at an end opposite from the top wall; the top sealing portion has a second side at an end opposite from the top wall; a first included angle and a second included angle are formed between the second side of the top sealing portion and the first side of the two side sealing portions respectively; and in the first direction, the circuit board is located between the first included angle and the second included angle;

the battery further comprises a protective body, wherein the circuit board comprises a circuit board body and an electronic component provided on the circuit board body, and the protective body is configured to protect the electronic component; and the protective body covers the first included angle and the second included angle.

2. The battery according to claim 1, wherein the protective body covers the electronic component and a gap between the electronic component and the circuit board body.

3. The battery according to claim 2, wherein the protective body is provided on a surface of the circuit board facing towards the cell, and a bonding piece is provided between the protective body and the cell, the bonding piece bonding the protective body to the top sealing portion of the cell.

4. The battery according to claim 3, wherein a height of the protective body protruding from the electronic component is $H_1$, and 0.03 mm$\leq H_1\leq$0.3 mm.

5. The battery according to claim 1, wherein the protective body covers the circuit board and a gap between the circuit board and the cell.

6. The battery according to claim 1, wherein the battery further comprises a flexible printed circuit board, wherein the flexible printed circuit board comprises a first portion, a second portion and a bending portion; the first portion is connected to the circuit board and is wrapped by the protective body; the second portion is provided outside the protective body; and the bending portion connects the first portion and the second portion and configures the second portion to change position relative to the first portion, and the bending portion is provided outside the protective body.

7. The battery according to claim 6, wherein the protective body comprises a second body portion and an edge portion interconnected with the second body portion, the second body portion covers two opposite surfaces of the circuit board, the edge portion covers the first included angle and the second included angle, and the bending portion is provided on the edge portion.

8. The battery according to claim 7, wherein a distance between the bending portion and the second body portion in the first direction is $D_1$, and a height difference between the second body portion and the edge portion in the second direction is $H_2$, wherein $D_1$>0.5 mm, 0.5 mm$\leq H_2\leq$2 mm.

9. The battery according to claim 7, wherein on a side of the second body portion facing away from the cell, a height of the second body portion protruding from the electronic component is $H_3$, and 0.1 mm$\leq H_3\leq$0.5 mm; and a height of the edge portion protruding from the first included angle and the second included angle is $H_4$, and 0.1 mm$\leq H_4\leq$0.5 mm.

10. The battery according to claim 1, wherein an included angle between the first side and the second direction is $\alpha_1$, and $5°\leq\alpha_1\leq45°$; and the second direction is a direction of the cell facing towards the circuit board.

11. The battery according to claim 5, wherein the protective body is provided with a groove on a side facing away from the cell, the groove exposes a conductive part of the battery, and the conductive part is electrically connected to the circuit board and a tab of the cell.

12. The battery according to claim 11, wherein the groove is located at the center of the conductive part, or at the center of an orthographic projection of the cell in the first direction.

13. The battery according to claim 1, wherein the protective body is an injection molding body formed through a low-pressure injection molding process or a glue filling process.

14. The battery according to claim 1, wherein the protective body comprises a bracket; wherein the bracket comprises a first plate body, a second plate body and a third plate body; the third plate body connects the first plate body and the second plate body, the first plate body and the second plate body are disposed opposite to each other; and the first plate body and the second plate body extend to two opposite sides of the circuit board respectively.

15. The battery according to claim 14, wherein the bracket further comprises a reinforcing part, wherein the reinforcing part is provided between the circuit board and at least one of the first plate body and the second plate body.

16. The battery according to claim 14, wherein the first plate body and/or the second plate body is provided with a clearance zone, the conductive part of the battery is provided in the clearance zone, and the conductive part is electrically connected to the circuit board and a tab of the cell.

17. The battery according to claim 16, wherein a distance between an edge of the clearance zone and the conductive part is $L_1$, and 1 mm$\leq L_1$.

18. The battery according to claim 1, wherein the protective body comprises an elastic sheet, and the elastic sheet is provided on at least one surface of the circuit board;

the elastic sheet is in contact with the electronic component on a corresponding side of the circuit board; and/or the elastic sheet is provided on the conductive part of the battery.

19. An electronic device comprising a load and the battery according to claim 1, wherein the battery is configured to supply power to the load.

* * * * *